US012732987B2

(12) United States Patent
Desai et al.

(10) Patent No.: US 12,732,987 B2
(45) Date of Patent: Sep. 8, 2026

(54) METHOD AND SATELLITE SYSTEM FOR SCHEDULING FORWARD LINK RESOURCE ALLOCATIONS AND RETURN LINK RESOURCE ALLOCATIONS OF A SATELLITE LINK

(71) Applicant: Skylo Technologies, Inc., Mountain View, CA (US)

(72) Inventors: Soham Dhiren Desai, Palo Alto, CA (US); Andrew Nuttall, Mountain View, CA (US); Meghna Agrawal, Cupertino, CA (US)

(73) Assignee: Skylo Technologies, Inc., Mountain View, CA (US)

( * ) Notice: Subject to any disclaimer, the term of this patent is extended or adjusted under 35 U.S.C. 154(b) by 419 days.

(21) Appl. No.: 18/401,518

(22) Filed: Dec. 31, 2023

(65) Prior Publication Data

US 2025/0220660 A1 Jul. 3, 2025

(51) Int. Cl.
*H04W 72/50* (2023.01)
*H04L 1/00* (2006.01)
(Continued)

(52) U.S. Cl.
CPC ........... *H04W 72/12* (2013.01); *H04L 1/0001* (2013.01); *H04L 1/0003* (2013.01);
(Continued)

(58) Field of Classification Search
CPC ..... H04L 1/0001; H04L 5/1438; H04L 47/78; H04W 72/52; H04W 72/04;
(Continued)

(56) References Cited

U.S. PATENT DOCUMENTS 7,469,124 B1 * 12/2008 Chethik ................. H04H 20/42 370/329
7,590,083 B2 9/2009 Haugli
(Continued)

OTHER PUBLICATIONS

LTE; Evolved Universal Terrestrial Radio Access (E-UTRA); Medium Access Control (MAC) protocol specification (3GPP TS 36.321 version 15.2.0 Release 15).

*Primary Examiner* — Salvador E Rivas
(74) *Attorney, Agent, or Firm* — Brian R. Short

(57) ABSTRACT

Apparatuses, methods, and systems of scheduling wireless communication through a satellite link are disclosed. One method includes determining a forward link quality of a forward link and a return link quality of a return link, determining a forward data rate requirement for a forward timing interval and a return data rate requirement for a return timing interval, determining a modulation and coding scheme (MCS) of the forward link based on the forward link quality, the return link quality, the forward data rate requirement, the return data rate requirement, a MCS of the return link, the forward timing, and the return timing interval, scheduling forward link resource allocations and return link resource allocations based on the MCS of the forward link, the MCS of the return link, forward data rate requirement and a return data rate requirement, the forward timing interval, and the return timing interval.

20 Claims, 9 Drawing Sheets

(51) Int. Cl.

| | |
|---|---|
| ***H04W 72/04*** | (2023.01) |
| ***H04W 72/12*** | (2023.01) |
| *H04L 5/14* | (2006.01) |
| *H04L 47/78* | (2022.01) |
| *H04W 72/54* | (2023.01) |
| *H04W 76/15* | (2018.01) |
| *H04W 84/06* | (2009.01) |

(52) U.S. Cl.
CPC ........... *H04L 1/0009* (2013.01); *H04W 72/04* (2013.01); *H04W 72/50* (2023.01); *H04L 5/1438* (2013.01); *H04L 47/78* (2013.01); *H04W 72/54* (2023.01); *H04W 76/15* (2018.02); *H04W 84/06* (2013.01)

(58) Field of Classification Search
CPC ........... H04W 72/0413; H04W 72/042; H04W 72/50; H04W 72/54; H04W 76/15
See application file for complete search history.

(56) References Cited

U.S. PATENT DOCUMENTS

| | | | | |
|---|---|---|---|---|
| 7,995,515 | B2 | 8/2011 | Thesling | |
| 8,169,955 | B2 | 5/2012 | Ansari et al. | |
| 10,117,249 | B2 | 10/2018 | Ravishankar et al. | |
| 10,506,483 | B1 | 12/2019 | Williamson | |
| 10,693,574 | B2 | 6/2020 | Wu et al. | |
| 11,096,188 | B1 * | 8/2021 | Vasisht | H04B 7/195 |
| 2005/0207375 | A1 * | 9/2005 | Schiff | H04B 7/18534 455/436 |
| 2011/0128867 | A1 * | 6/2011 | Tian | H04L 1/0002 370/252 |
| 2017/0238216 | A1 * | 8/2017 | Damnjanovic | H04B 7/18541 455/427 |
| 2019/0007129 | A1 * | 1/2019 | Vargas | H04B 7/1858 |
| 2021/0175961 | A1 * | 6/2021 | Liu | H04B 7/18513 |
| 2024/0097780 | A1 * | 3/2024 | Ji | H04B 7/18591 |

* cited by examiner

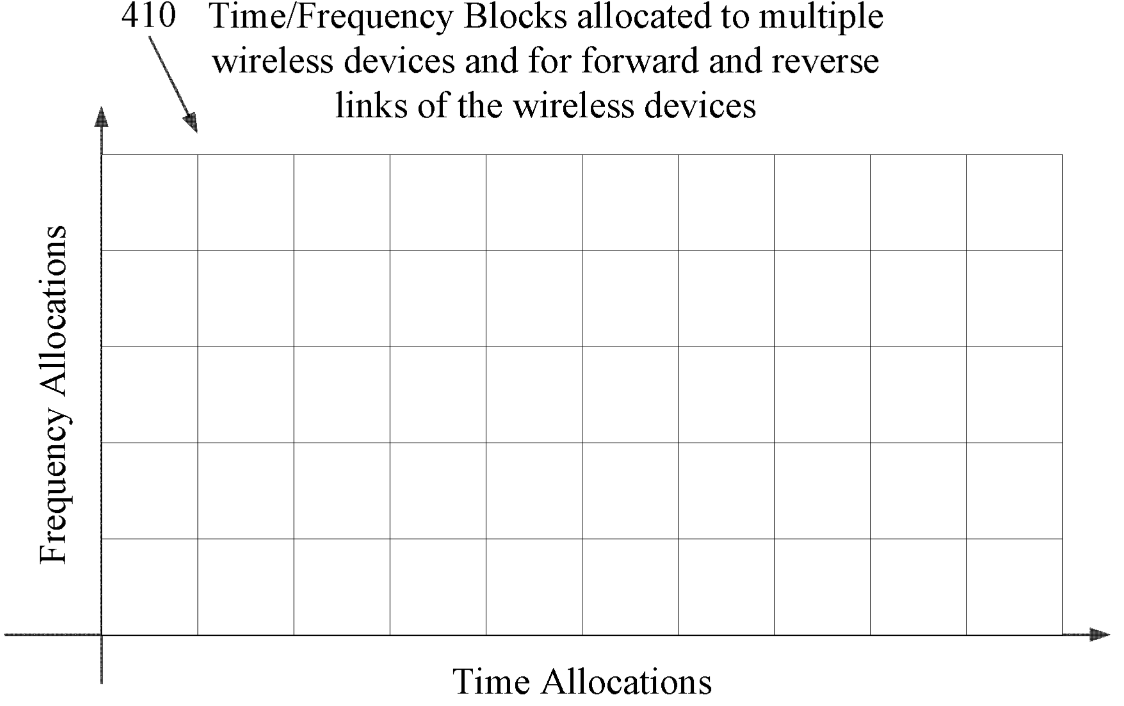
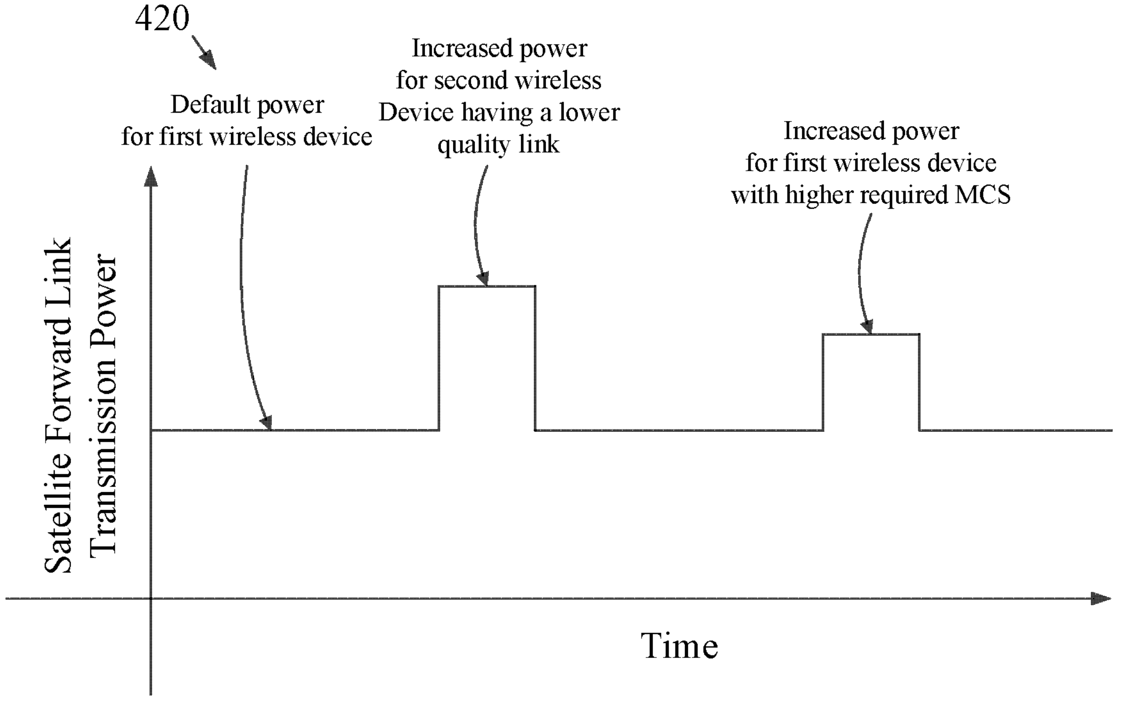
Figure 4

Resource allocation table 610

Resource Units

MCS Selections

| | 1 | 2 | 3 | 4 | 5 | 6 | 7 | 8 |
|---|---|---|---|---|---|---|---|---|
| MCS0 | 16 | 32 | 56 | 88 | 120 | 152 | 208 | 256 |
| MCS1 | 24 | 56 | 88 | 144 | 176 | 208 | 256 | 344 |
| MCS2 | 32 | 72 | 144 | 176 | 208 | 256 | 328 | 424 |
| MCS3 | 40 | 104 | 176 | 208 | 256 | 328 | 424 | 568 |
| MCS4 | 56 | 120 | 208 | 256 | 328 | 408 | 552 | 680 |
| MSC5 | 72 | 144 | 224 | 328 | 424 | 504 | 680 | 872 |
| MCS6 | 88 | 176 | 256 | 392 | 504 | 600 | 808 | 1000 |
| MCS7 | 104 | 224 | 328 | 472 | 584 | 712 | 1000 | 1224 |
| MCS8 | 120 | 256 | 392 | 536 | 680 | 808 | 1096 | 1384 |
| MCS9 | 136 | 296 | 456 | 616 | 776 | 936 | 1256 | 1544 |
| MCS10 | 144 | 328 | 504 | 680 | 872 | 1000 | 1384 | 1736 |
| MCS11 | 176 | 376 | 584 | 776 | 1000 | 1192 | 1608 | 2024 |
| MCS12 | 208 | 440 | 680 | 1000 | 1128 | 1352 | 1800 | 2280 |
| MCS13 | 224 | 488 | 744 | 1128 | 1256 | 1544 | 2024 | 2536 |

Figure 6

Low Data Rate Case1 710

| Payload Length (Kilo bits) | Total Time (mS) | Data Rate (kbps | Time allocated for Downlink (mS) | Link Margin DL (dB) | Selected MCS DL | Repetition DL | Link Margin UL | Selected MCS UL | Repetition UL |
|---|---|---|---|---|---|---|---|---|---|
| 160 | 160 | 1 | 16 | 7.23 | 2 | 4 | 6.85 | 2 | 2 |
| 160 | 160 | 1 | 32 | 10.5 | 1 | 4 | 3.85 | 2 | 1 |
| 160 | 160 | 1 | 48 | 11.11 | 0 | 8 | 3.25 | 3 | 1 |
| 160 | 160 | 1 | 64 | 11.11 | 0 | 8 | 3.25 | 3 | 1 |
| 160 | 160 | 1 | 80 | 14.11 | 0 | 16 | 0.75 | 6 | 1 |
| 160 | 160 | 1 | 96 | 14.11 | 0 | 16 | 0.75 | 6 | 1 |

High Data Rate Case2 720

| Payload Length (Kilo bits) | Total Time (mS) | Data Rate (kbps | Time allocated for Downlink (mS) | Link Margin DL (dB) | Selected MCS DL | Repetition DL | Link Margin UL | Selected MCS UL | Repetition UL |
|---|---|---|---|---|---|---|---|---|---|
| 160 | 160 | 2 | 16 | 4.86 | 2 | 2 | 1.35 | 5 | 1 |
| 160 | 160 | 2 | 32 | 7.8 | 4 | 8 | 1.35 | 5 | 1 |
| 160 | 160 | 2 | 48 | 9.61 | 2 | 8 | 0.05 | 7 | 1 |
| 160 | 160 | 2 | 64 | 10.5 | 1 | 8 | 0.05 | 7 | 1 |
| 160 | 160 | 2 | 80 | 10.5 | 1 | 8 | 1.65 | 10 | 1 |
| 160 | 160 | 2 | 96 | 10.5 | 1 | 8 | 1.65 | 10 | 1 |
| 160 | 160 | 2 | 112 | 13.5 | 1 | 16 | Not Possible | Not Possible | Not Possible |

Figure 7

METHOD AND SATELLITE SYSTEM FOR SCHEDULING FORWARD LINK RESOURCE ALLOCATIONS AND RETURN LINK RESOURCE ALLOCATIONS OF A SATELLITE LINK

FIELD OF THE DESCRIBED EMBODIMENTS

The described embodiments relate generally to wireless communications. More particularly, the described embodiments relate to systems, methods, and apparatuses for scheduling forward link resource allocations and return link resource allocations of a satellite link.

BACKGROUND

Satellite networks operate to cover large areas and can have a large number of users. Further, only limited amounts of spectral resources are allocated to satellite networks. Voice data over satellite networks requires set amounts of data bandwidth and rigid timing. Accordingly, a satellite network should manage connectivity of wireless devices to the satellite network.

It is desirable to have methods, apparatuses, and systems for scheduling forward link resource allocations and return link resource allocations of a satellite link.

SUMMARY

An embodiment includes a method of scheduling wireless communication through a satellite link between a base station and a wireless device. The method includes determining a forward link quality of a forward link of the satellite link and a return link quality of a return link of the satellite link, determining a forward data rate requirement for a forward timing interval and a return data rate requirement for a return timing interval for the wireless device, determining a modulation and coding scheme (MCS) of at least one of the forward link or the return link based on the forward link quality, the return link quality, the forward data rate requirement and return data rate requirement, a MCS of the other of the forward link and the return link, and forward timing interval and the return timing interval, scheduling forward link resource allocations and return link resource allocations of the wireless device based on the MCS of the forward link, the MCS of the return link, forward data rate requirement and a return data rate requirement, and forward timing interval and the return timing interval, and wirelessly communicating, by the base station, with the wireless device according to the scheduled forward link resource allocations and return link resource allocations.

Another embodiment includes a satellite system including a base station, a wireless device, and a satellite configured to support a satellite link between the base station and the wireless device. The base station is configured to determine a forward link quality of a forward link of the satellite link and a return link quality of a return link of the satellite link, determine a forward data rate requirement for a forward timing interval and a return data rate requirement for a return timing interval for the wireless device, determine a modulation and coding scheme (MCS) of at least one of the forward link or the return link based on the forward link quality, the return link quality, the forward data rate requirement and return data rate requirement, a MCS of the other of the forward link and the return link, and forward timing interval and the return timing interval, schedule forward link resource allocations and return link resource allocations of the wireless device based on the MCS of the forward link, the MCS of the return link, forward data rate requirement and a return data rate requirement, and forward timing interval and the return timing interval, and wirelessly communicate with the wireless device according to the scheduled forward link resource allocations and return link resource allocations.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 shows a schedule that includes time and frequency allocations, and timeline of a transmission power level of the base station according to a selected scheduling of resource blocks, according to an embodiment.

FIG. 6 is a table that depicts different MCSs (modulation and coding schemes) and corresponding resource unit allocations, according to an embodiment.

FIG. 7 shows tables that depict selected values of MCS for downlink (forward link) and uplink (return link) based on the forward link quality (link margin DL), the return link quality (link margin UL), the forward data rate requirement and return data rate requirement (data rate), and forward timing interval (time allocated for downlink) and the return timing interval (total time-time allocated for downlink), according to an embodiment.

DETAILED DESCRIPTION

The embodiments described include methods, apparatuses, and systems for scheduling forward link resource allocations and return link resource allocations of a satellite link between a base station and a wireless device. For an embodiment, a modulation and coding scheme (MCS) of a forward link is selected based on a forward link quality, a return link quality, a forward data rate requirement, a return data rate requirement, an MCS of the return link, a forward timing interval, and a return timing interval. For an embodiment, the scheduling of the forward link resource allocations and the return link resource allocations of the wireless device is based on an MCS of the forward link, the MCS of the return link, a forward data rate requirement, a return data rate requirement, the forward timing interval and the return timing interval. For an embodiment, data communicated through the forward link and the return link include voice data that has data rate and timing requirements that impact MCS selections for the forward link and the return link. Further, a power level of forward link wireless communication may be adapted based on the forward link quality, and/or interference of another wireless device.

It is to be understood that an MCS selection of the described embodiments can include a repetitions selection. For an embodiment, a repetition selection provides a transmitted data packet with transmit diversity in which the data packet is transmitted multiple times to achieve a high effective average signal to strength at the receiving device (wireless device or base station). For example, a repetition selection of 2 can provide a 3 dB improvement of SNR (signal to noise ratio) at the receiving device. Accordingly, for at least some embodiments the MCS selection includes a modulation selection, a coding selection, and a repetition selection.

Figure 1:
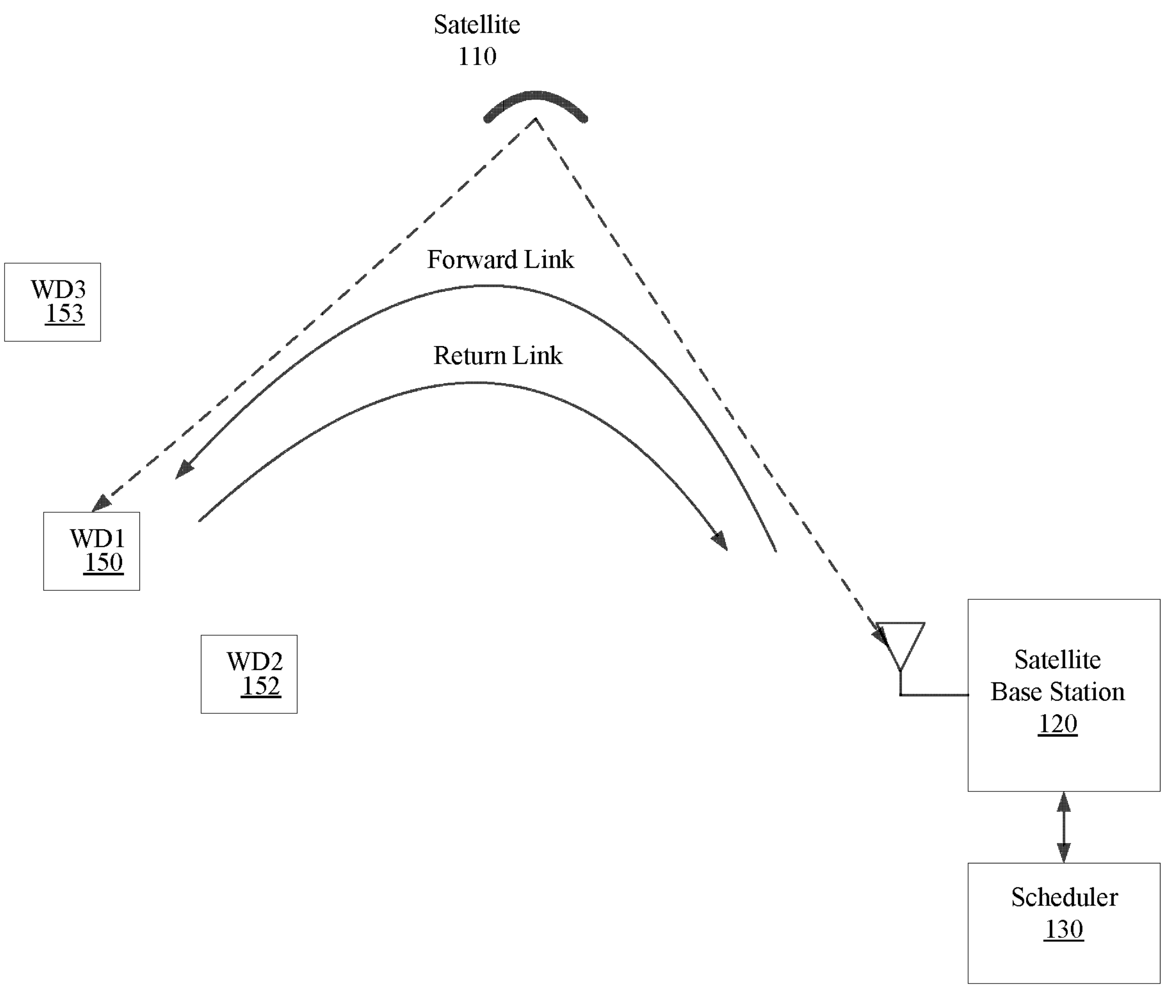
FIG. 1 shows a satellite network that includes a base station and a plurality of wireless devices, depicting a forward link and a return link, according to an embodiment.

FIG. 1 shows a satellite network that includes a base station 120 and a plurality of wireless devices 150, 152, 153, depicting a forward link and a return link, according to an embodiment. As shown, a wireless satellite link is formed between the base station 120 and the wireless device 150 through a satellite 110. As shown, the wireless satellite link includes a forward link from the base station 120 to the wireless device 150, and a return link from the wireless device 150 to the base station 150.

For an embodiment, the base station 120 is configured to determine a forward link quality of a forward link of the satellite link and a return link quality of a return link of the wireless satellite link. For an embodiment, the wireless device transmits pilot signals that are received by the base station 120 and used for determining the forward link quality. For an embodiment, the pilot signal is a reference signal that is transmitted with a known frequency, a known signal power, and known phase. By knowing the frequency, signal power, and phase of the transmitted pilot signal, the base station 120 can estimate the return link quality by comparing the frequency, signal power, and phase of a received version of the pilot signal with the known transmitted version of the pilot signal. Further, for an embodiment, the base station 120 can determine the forward link quality from a channel quality report generated and sent by the wireless device 150. That is, the base station 120 also transmits pilot signals that the wireless device 150 uses to determine the forward link quality, which is then communicated back to the base station 120 through the channel quality report.

For an embodiment, the base station 120 is further configured to determine a forward data rate requirement for a forward timing interval and a return data rate requirement for a return timing interval for the wireless device. For an embodiment, during establishment of the wireless satellite link connection between the base station 120 and the wireless device 150 data rate requirements and timing intervals requirements are decided and exchanges between the base station 120 and the wireless device 150.

In order to facilitate the communication of voice data between the wireless device 150 and the base station 120, for an embodiment, the wireless device includes a voice encoder. For an embodiment, the voice encoder analyzes and synthesizes a human voice signal for audio data compression, multiplexing, voice encryption or voice transformation. For an embodiment, the voice encoder includes a voice CODEC (compression/decompression) for telecommunications for speech coding to conserve bandwidth in transmission. For an embodiment, the CODEC samples the voice signal at a fixed interval and generates data samples. For an embodiment, the sampling interval determines the timing interval requirement. For an embodiment, the forward data rate requirement for the forward timing interval and the return data rate requirement for the return timing interval are determined by the voice encoder of the wireless device 150.

For an embodiment, the base station 120 is further configured to determine a modulation and coding scheme (MCS) of at least one of the forward link or the return link based on the forward link quality, the return link quality, the forward data rate requirement and return data rate requirement, a MCS of the other of the forward link and the return link, and forward timing interval and the return timing interval. For an embodiment, at least initially, the MCS of the other of the forward link and the return link is set to a default value. For an embodiment, an initial MCS for use is determined by the base station considering the link quality and the data rate and intervals needed for this particular session (predetermined interval) of communication. This is done for both forward and return link and the base station informs the wireless device.

For an embodiment, the base station 120 is further configured to schedule forward link resource allocations and return link resource allocations of the wireless device based on the MCS of the forward link, the MCS of the return link, forward data rate requirement and a return data rate requirement, and forward timing interval and the return timing interval. For an embodiment, a scheduler 130 performs the scheduling, wherein the scheduling informs the wireless device 150 about the MCS/Repetitions (TTI bundling), timing and frequency information for both the forward link and return link. The scheduling informs the wireless device 150 of the time and frequency information about when the wireless device 150 is to receive forward link messages from the base station 120, and when the wireless device 150 is to transmit return link messages to the base station 120. For an embodiment, the timing and frequency information includes resource allocations or blocks that include time and frequency allocations for both the wireless device and the base station. The wireless device and the base station coordinate forward link and reverse link wireless communication according to the scheduling.

For an embodiment, the scheduling provides the base station 120 with a determination of frequency and time MCS/Repetitions for the forward link and the return link so as to ensure the timing requirements are met and a link closes (link is competed) for both the return link and the forward link. That is, the MCS and repetition allocations are selected ensure that the wireless device and the base station are allocated enough time and frequency resources to enable the wireless device and the base station to complete a wireless connection that supports the timing and data requirements of, for example, a voice connection between the wireless device and the base station. For an embodiment, the base station 120 is further configured to wirelessly communicate with the wireless device according to the scheduled forward link resource allocations and return link resource allocations. For an embodiment, the wireless communication is to meet a specified BER (bit error rate). For an embodiment, the MCS and repetition selection allowed the wireless connection between the wireless device and the base station to satisfy the specified BER. As previously described, the MCS is a modulation and coding scheme of the wireless communications, and the repetitions specify how many times bits or bytes of the wireless communication are transmitted from the wireless device to the base station, or from the base station to the wireless device.

While described as the base station determining the forward link quality of the forward link, the return link quality of the return link, the forward data rate requirement for the forward timing interval, the return data rate requirement for the return timing interval, the modulation and coding scheme (MCS) of at least one of the forward link or the return link, and the scheduling of the forward link resource allocations and the return link resource allocations, it is to be understood that one or more of these actions may be determined elsewhere in the satellite network. For example, one or more of these actions may be performed by other satellite network elements, such as, a schedule service which then informs the base station 120 of the decisions and parameters.

As previously described, for an embodiment, the forward data rate requirement for the forward interval and the return data rate requirement for the return interval are determined by a voice encoder. As previously described, the voice encoder may include a CODEC (compression/decompression) that samples the voice signal at a fixed interval and generates data samples. For an embodiment, the sampling interval determines the timing interval requirement including the forward timing interval requirement and the return timing interval requirement. Further, for an embodiment, the forward data rate requirement for the forward timing interval and the return data rate requirement for the return timing interval are determined by the voice encoder of the wireless device 150.

For an embodiment, the base station is further configured to determine propagation timing information associated with the wireless device. That is, wireless signals propagating from the base station to the wireless device, and from the wireless device to the base station have a propagation time. Further, the propagation time for different wireless devices can vary greatly as compared to the timing of the scheduling. For an embodiment, the scheduling of the forward link resource allocations and the return link resource allocations of the wireless device is further based on the propagation timing information to ensure no overlap in scheduled uplink and downlink resources for the wireless device.

At least some satellite communication systems, such as, half duplex NTN (non-terrestrial node) systems like Voice-over NB-NTN have strong timing requirements which need to account for propagation delay.) Accordingly, at least some embodiments use the propagation delay in scheduling data traffic, thereby ensuring that there is no overlap in scheduled uplink and downlink resources for a wireless device in terms of subframes and time allocation. Further, at least some embodiments ensure no scheduling conflicts are seen due to changing propagation times between different wireless devices connected with the base station.

As previously described, the MCS at least one of the forward link or the return link is determined based on the forward link quality, the return link quality, the forward data rate requirement and return data rate requirement, a MCS of the other of the forward link and the return link, and forward timing interval and the return timing interval. Further, for an embodiment, at least initially, the MCS of the other of the forward link and the return link is set to a default value. For an embodiment, the default value of the MCS for either the forward link or the return link is determined from a fixed mapping between the determined or measured link quality (forward and/or return) and the default MCS. That is, different levels of determined or measured link quality have a corresponding different default MCS value. For example a link quality or measured signal strength of 10 dB may be mapped to a default MCS value of MCS 10.

As described, for at least some embodiments, multiple wireless devices 150, 152, 153 are wirelessly communicating with the base station 120 through the satellite 110. Accordingly, for an embodiment, the scheduling of each of the wireless devices accounts for the scheduling of the other wireless devices communicating with the base station 120. For an embodiment, the MCS of the forward link is further determined based upon an MCS of a forward link of another wireless device, and the MCS of the return link is further determined based upon the MCS of a return link of another wireless device.

Further, for an embodiment, the scheduling forward link resource allocations and return link resource allocations of the wireless device is further based on forward link resource allocations and return link resource allocations of another wireless device. As described, the base station can be wirelessly connected to many wireless devices. Accordingly, in order to efficiently utilize the time and frequency resources allocated to the base station for wireless communication with the many (multiple) wireless devices, the scheduling accounts for more than just the single wireless device. Further, for an embodiment, the scheduling of each of the wireless devices provides enough time and frequency resources allocations to allow the wireless devices to satisfy the data and timing requirements needed by the wireless device. However, no more time and frequency resources should be allocated to reduce the impact on the scheduling of other of the wireless devices. Further, a transmission power level of the base station may be adaptively selected for each of the wireless devices that allows for an MCS and repetition selection that satisfies the data and timing requirements of the corresponding wireless device, but not more than a threshold amount greater to reduce interference with other of the wireless devices. For an embodiment, the transmission power level of a base station may be adaptively selected for each message for each of the wireless devices. Further, for an embodiment, the base station may assign a higher transmission power level to a wireless device such that a wireless device may meet its timing and data requirements if a default transmission power level does not allow the wireless device to meet the timing and data requirements.

Further, for an embodiment, the scheduling of the forward link resource allocations and the return link resource allocations of the wireless device is further based on the propagation timing information of other wireless devices to ensure no overlap in scheduled uplink and downlink resources for the wireless device and the other wireless devices. That is, the propagation times for each of the wireless devices may be different. Accordingly, for an embodiment, the scheduling of the time and frequency resource blocks for each of the different wireless devices accounts for the differences in the propagation delay between the different wireless devices such that the scheduling of the different wireless devices do not overlap.

For an embodiment, an output power of a satellite (Earth Station/Base station) forming the satellite link is based on the scheduling of the forward link resource allocations and the return link resource allocations of the wireless device. For an embodiment, the satellite 110 provides a fixed gain to wireless signals propagating through the satellite. Therefore, for an embodiment, the output power of the satellite 110 is determined or set by adjusting the power level of the wireless communication signals transmitted from the base station 120. Increasing the transmission power of the base station increases the possible MCS selections for the forward link to the wireless device. Typically, the transmission power level of the wireless devices is fixed, and therefore, the MCS selections in the return link are more limited than the MCS selections in the forward link. For an embodiment, a default transmission power level of the base station is adaptively adjusted to enable the timing and data requirements of the forward link and the return link to be met.

As will be described, FIG. 6 is a table that depicts different MCSs (modulation and coding schemes) and corresponding resource unit allocations, according to an embodiment.

An embodiment includes adapting a transmit power of a satellite of the satellite link differently for different of a plurality of wireless devices. For an embodiment, the adapted transmit power of the satellite is adjusted when the timing requirements of the data for the forward link and the return link cannot be met by selecting between a range of accessible MCS and repetition ranges for the forward and return links. When this happens the range of possible MCS selections and repetition selections are improved by fundamentally enhancing the underlying link quality. There are two common culprits for low link quality, signal to noise ratio and signal to interface ratio, both can limit the link quality under different circumstances for satellite communications through the forward link and the return link.

For an embodiment, when the signal to noise ratio is limiting the MCS selections, the base station may elect to dynamically increase the output power of transmission signals from the base station (and subsequently then the satellites power because for an embodiment, the satellite is a fixed gain system), on a dynamic basis for all symbols sent to a specific wireless device. The increased transmission power of wireless communication from the satellite to the base station improves the signal to noise ratio of wireless communications from the satellite to the wireless device which enables higher MCSs to be used, which can therefor enable MCS selections that allow data transmitted through the forward link and the return link to meet fixed timing requirements.

For an embodiment, when the signal to interference ratio is limiting the MCS selections, an adjacent base station may elect to decrease its transmit power on a per time frame basis to allow its neighbor base station (which may be the base station the wireless device is communicating with) to select a higher MCS now may available by the resulting reduction in interference.

An embodiment includes adapting a transmit power of a satellite of the satellite link based on the determined MCS of the wireless device. If the MCS of the wireless device is increased, the transmit power of the satellite may be accordingly increased to accommodate the increased MCS.

An embodiment includes adapting a transmit power of a satellite of the satellite link based on a determined level of interference of a neighboring wireless device. That is, if interference of the neighboring wireless device is determined, the transmit power of the satellite may be accordingly decreased to mitigate the interference of the neighboring wireless device.

For an embodiment, a satellite of the satellite link provides a fixed level of gain, and wherein a transmit power of the satellite is adjusted by adjusting a transmit power level of the base station.

An embodiment includes adapting a transmit power of a satellite of the satellite link from one resource block to another resource block of the scheduled forward link resource allocations and return link resource allocations of the wireless device, wherein each resource block of the schedule includes a time and frequency allocation. For an embodiment, the transmission power level of the base station changes over time according to the scheduling. That is, the data and timing requirements of the wireless device can change over time. Accordingly, the selected power level of the base station can change over time while wirelessly communicating with the wireless device to satisfy the data and timing requirements of the wireless device. For an embodiment, the transmission power level of the wireless communication with the wireless device does not exceed the selected power level by more than a threshold to reduce interference with wireless communication with other wireless devices. In summary, the wireless satellite system adapts the transmission power from the satellite (which can be accomplished by controlling the transmission power from the base station) dynamically based on which resource block in the schedule is currently active by taking into account both the time and frequency assignment of each block. This allows optimization of power usage across the different scheduled allocations which can be allocated to different wireless devices.

For an embodiment, the base station utilizes a changing propagation timing information and a mismatch (small delta) in the propagation delays between forward and return delays for scheduling resources for forward and return links. As described, the satellites may be moving relative to the wireless devices at high speeds. Accordingly, the propagation delay between the forward link and the return link is constantly changing. Therefore, over differential moments in time, the forward link and the return link propagation delays will be slightly different. The scheduling accounts for the slight difference to align the forward link and the return link scheduling to avoid overlap. That is, one schedule of the forward link and the return link will be time offset by the timing differential between the forward link and the return link. For an embodiment, during scheduling, the base station takes into consideration the high propagation times/changing propagation delays such that the end user has a real time voice call such that the Uplink and Downlink transmission have no overlap. For an embodiment, computation delays at either the wireless device or the base station can additionally be included in the propagation delays and the changing/different delays between the forward link and the return link. The rate of change of the location of the satellite can be used to determine the changes and mismatches between the forward link and the return link.

An embodiment includes monitoring, by the base station, the forward link quality of the forward link of the satellite link and the return link quality of the return link of the satellite link, and redetermining the MCS of at least one of the forward link or the return link, and rescheduling the forward link resource allocations and return link resource allocations of the wireless device when either of the forward link quality or the return link quality falls below a threshold.

Figure 2:
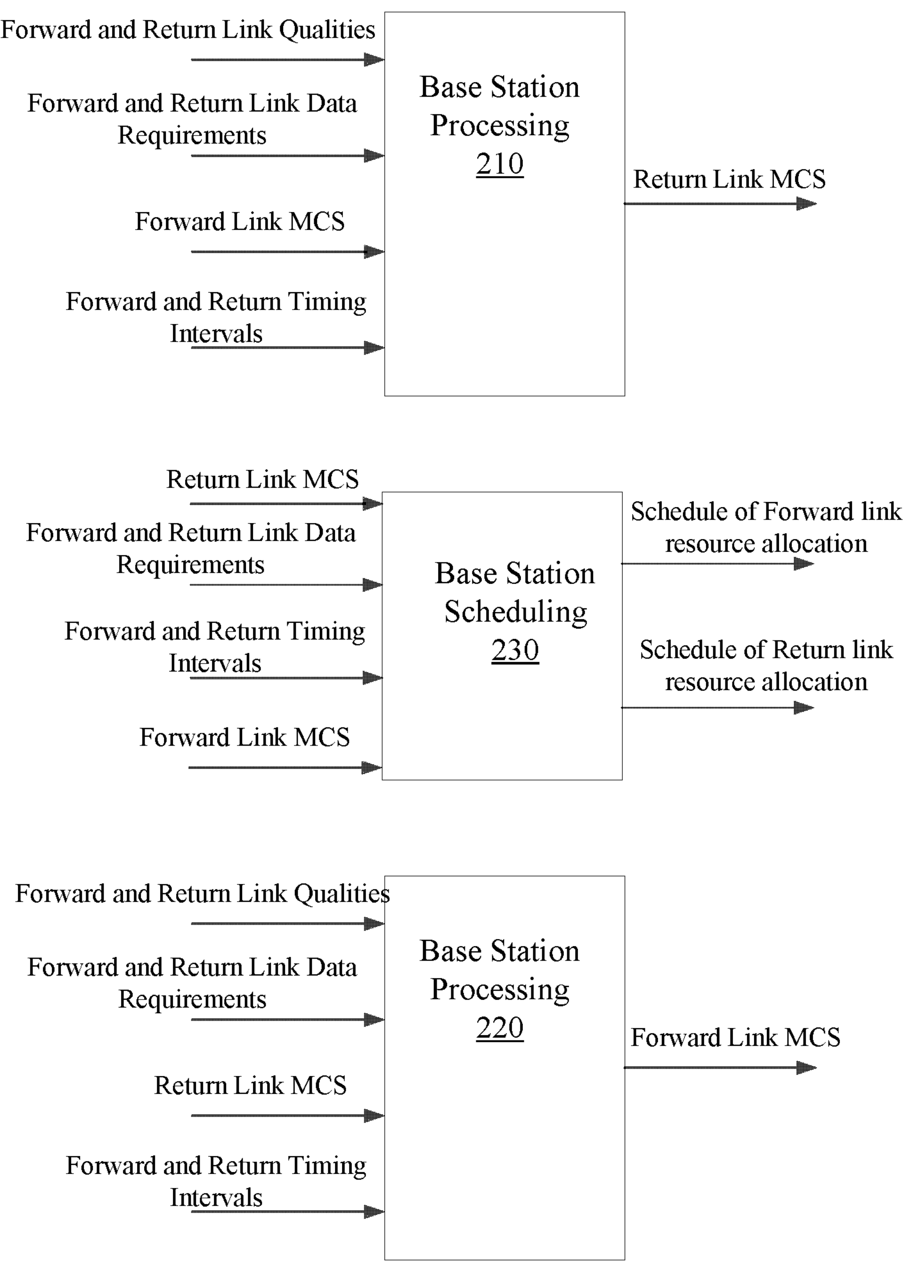
FIG. 2 shows processing and scheduling of a base station, according to an embodiment.

FIG. 2 shows processing and scheduling of a base station, according to an embodiment. As previously described, for an embodiment, the base station is further configured to determine a modulation and coding scheme (MCS) of at least one of the forward link or the return link based on the forward link quality, the return link quality, the forward data rate requirement and return data rate requirement, a MCS of the other of the forward link and the return link, and forward timing interval and the return timing interval. For an embodiment, this includes base station processing 210 configured to determine the return link MCS based on the forward link quality, the return link quality, the forward data rate requirement, the return data rate requirement, the MCS of the forward link, the forward timing interval, and the return timing interval. For an embodiment, this includes base station processing 220 configured to determine the forward link MCS based on the forward link quality, the return link quality, the forward data rate requirement, the return data rate requirement, the MCS of the return link, the forward timing interval, and the return timing interval. Further, for an embodiment, base station scheduling 230 determines the schedule of the forward link resource allocation and the schedule of the return link resource allocation based on the MCS of the forward link, the MCS of the return link, the forward data rate requirement, the return data rate requirement, the forward timing interval, and the return timing interval.

Figure 3:
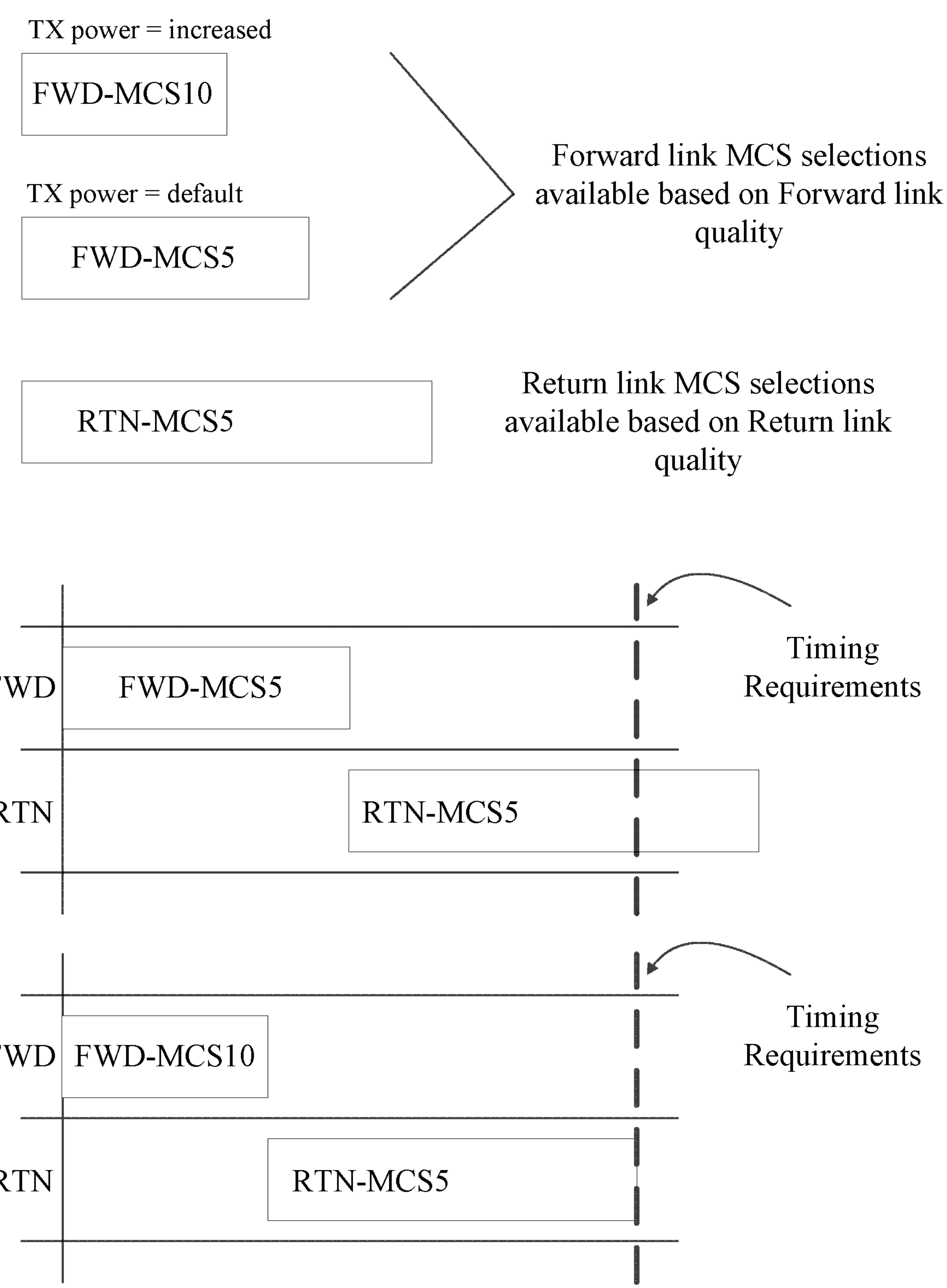
FIG. 3 shows a plurality of forward MCS (modulation and coding scheme) selections available for the forward link, and further depicts joint selections of the forward MCS and the return MCS, according to an embodiment.

FIG. 3 shows a plurality of forward MCS (modulation and coding scheme) selections available for the forward link, and further depicts joint selections of the forward MCS and the return MCS, according to an embodiment. As shown, for a default transmission power level, a forward link MCS available may be an MCS5 selection. However, with an increase transmission power level, the forward MCS available may be an MCS10 selection. Further, with the default transmission power level of the wireless device, the MCS5 selection is available for the return link. For an embodiment, the transmission power level of the mobile device is not adjustable, and therefore, only a limited number of MCS selections are available. As shown, with the MCS5 selection for the forward link and the MCS5 selection only available for the return link, the timing requirements (forward timing interval and the return timing interval) may not be able to be satisfied. However, with the increased transmission power level of the base station, the forward MCS is selected as MCS10. Accordingly, as shown, the timing requirements are then able to be met.

FIG. 4 shows a schedule 410 that includes time and frequency allocations, and timeline 420 of a transmission power level of the base station according to a selected scheduling of resource blocks, according to an embodiment. For an embodiment, the schedule 410 includes many resource blocks that designated a time allocations and frequency allocations in which communication (forward link and/or return link) can be scheduled. Further, the schedule 410 may include resource blocks designated for multiple wireless devices connected to the base station through the satellite. The time line 420 shows that the transmission power level (default or selected) may change from one resource block to another over time. The change in power level can be from one wireless device to another wireless device, or from on resource block of a wireless device to another resource block of the wireless device. As previously described, the transmission power level can be selectively adapted to increase the number of MCS selections available.

Figure 5:
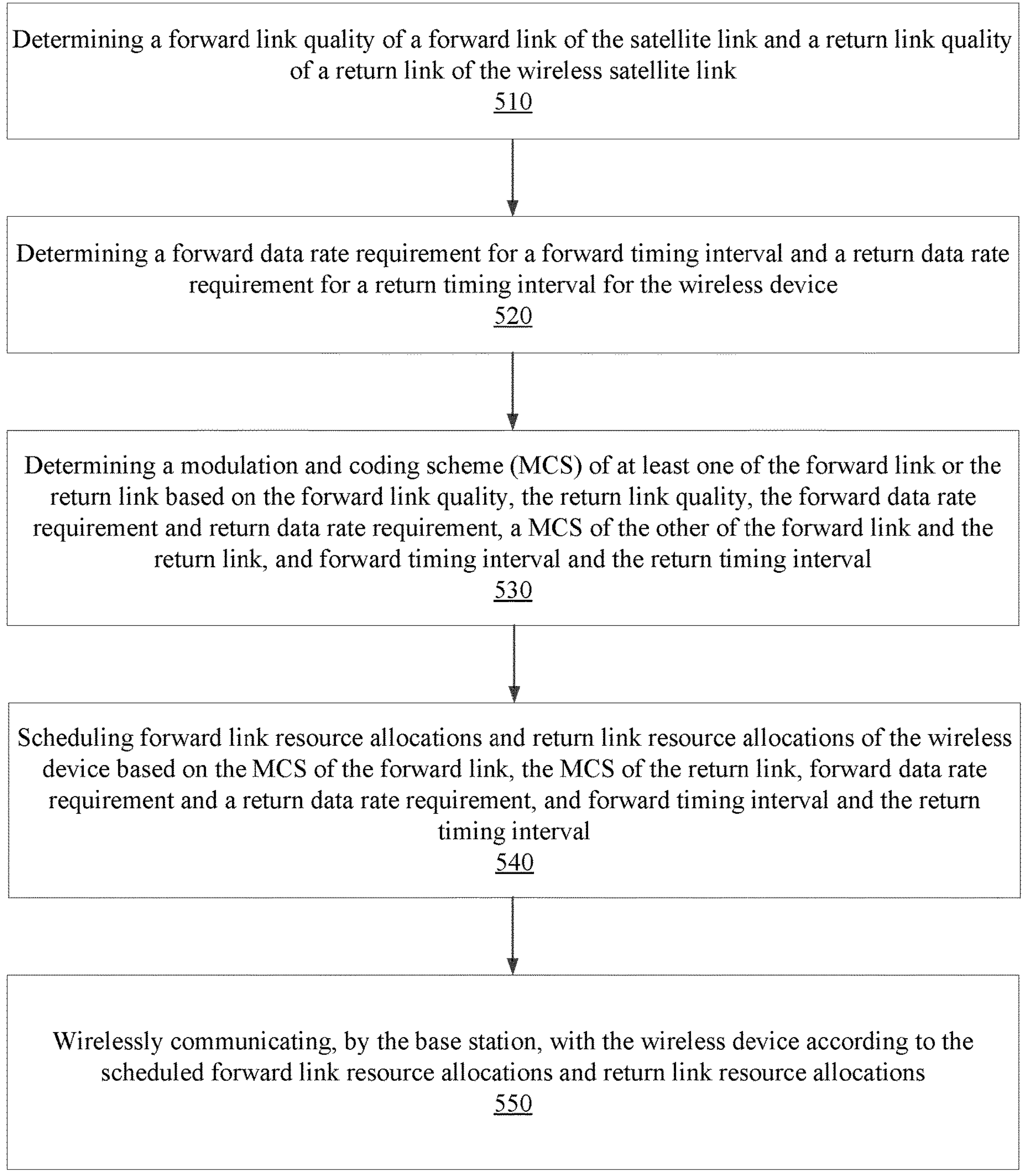
FIG. 5 is a flow chart that includes steps of a method of scheduling wireless communication through a satellite link between a base station and a wireless device, according to an embodiment.

FIG. 5 is a flow chart that includes steps of a method of scheduling wireless communication through a satellite link between a base station and a wireless device, according to an embodiment. A first step 510 includes determining a forward link quality of a forward link of the satellite link and a return link quality of a return link of the wireless satellite link. A second step 520 includes determining a forward data rate requirement for a forward timing interval and a return data rate requirement for a return timing interval for the wireless device. A third step 530 includes determining a modulation and coding scheme (MCS) of at least one of the forward link or the return link based on the forward link quality, the return link quality, the forward data rate requirement and return data rate requirement, a MCS of the other of the forward link and the return link, and forward timing interval and the return timing interval. A fourth step 540 includes scheduling forward link resource allocations and return link resource allocations of the wireless device based on the MCS of the forward link, the MCS of the return link, forward data rate requirement and a return data rate requirement, and forward timing interval and the return timing interval. A fifth step 550 includes wirelessly communicating, by the base station, with the wireless device according to the scheduled forward link resource allocations and return link resource allocations.

Forward Link Quality of a Forward Link

For an embodiment, the forward link quality of the forward link is a representation of how much data the forward link can communicate from the base station to the wireless device. The forward link quality can be represented by a signal strength of signals received by the wireless device from the base station. As previously described, the forward link quality can be adjusted by adjusting the transmission power from the satellite and/or the base station.

Return Link Quality of a Return Link

For an embodiment, the return link quality of the forward link is a representation of how much data the return link can communicate from the wireless device to the base station. The forward link quality can be represented by a signal strength of signals received by the base station from the wireless device.

As previously described, for an embodiment, the base station is configured to determine a forward link quality of a forward link of the satellite link and a return link quality of a return link of the wireless satellite link. For an embodiment, the wireless device transmits pilot signals that are received by the base station and used for determining the forward link quality. For an embodiment, the pilot signal is a reference signal that is transmitted with a known frequency, a known signal power, and known phase. By knowing the frequency, signal power, and phase of the transmitted pilot signal, the base station can estimate the return link quality by comparing the frequency, signal power, and phase of a received version of the pilot signal with the known transmitted version of the pilot signal. Further, for an embodiment, the base station can determine the forward link quality from a channel quality report generated and sent by the wireless device. That is, the base station also transmits pilot signals that the wireless device uses to determine the forward link quality, which is then communicated back to the base station through the channel quality report.

Forward Data Rate Requirement for a Forward Timing Interval

For an embodiment, the forward timing interval indicates how often forward packets are to be transmitted from the base station to the wireless device through the satellite. As stated, for an embodiment, the forward timing interval is based on supporting voice data. For an embodiment, the forward timing interval is selected by a voice encoder.

Return Data Rate Requirement for a Return Timing Interval

For an embodiment, the return timing interval indicates how often return packets are to be transmitted from the wireless device to the station through the satellite. As stated, for an embodiment, the return timing interval is based on supporting voice data. For an embodiment, the return timing interval is selected by a voice encoder.

As previously described, for an embodiment, the forward data rate requirement for the forward interval and the return data rate requirement for the return interval are determined by a voice encoder. As previously described, the voice encoder may include a CODEC (compression/decompression) that samples the voice signal at a fixed interval and generates data samples. For an embodiment, the sampling interval determines the timing interval requirement including the forward timing interval requirement and the return timing interval requirement. Further, for an embodiment, the forward data rate requirement for the forward timing interval and the return data rate requirement for the return timing interval are determined by the voice encoder of the wireless device.

MCS of the Forward Link

As described, the MCS is selected for data communication from the base station to the wireless device. As described, for an embodiment, different possible MCS selections may be available. However, the MCS selection of the forward link may be adaptively increased by increasing the transmission signal power from the base station. The MCS selection of the forward link may be adaptively increased to allow the forward link and return link data traffic to satisfy timing requirements of the data transmission due to voice communications. That is, in some situations, the transmission power of the base station, and therefore, the satellite is adaptively increased to allow a higher MCS selection in the forward link, which can allow the satellite system to satisfy the forward and return link data requirements and timing requirements. For an embodiment, the MCS selection of the forward link is selected based on a default power level of a transmission power from the base station. If the forward link and return link data traffic requirements and the forward link and return link timing requirements can not be met with the MCS selections available for the default power level, then the power level of the transmission power from the base station can be adaptively increased to increase the number of MCS selections of the forward link options available.

MCS of the Return Link

For an embodiment, the MCS selections of the return link are more limited than the MCS selections of the forward link because the option to adaptively change (increase) the transmission power of the wireless device may not be available.

Scheduling Forward Link Resource Allocations

As previously described, the forward link resource allocation may be scheduled according to a selectable schedule.

Scheduling Return Link Resource Allocations

As previously described, the return link resource allocation may be scheduled according to a selectable schedule.

For an embodiment, the scheduling of the forward link resource allocations and the return link resource allocations informs the wireless device of the MCS/Repetitions (TTI bundling), timing and frequency information for both the forward link and return link. The scheduling informs the wireless device of the time and frequency information about when and at what frequencies the wireless device is to receive forward link messages from the base station, and when and at what frequencies the wireless device is to transmit return link messages to the base station. For an embodiment, the timing and frequency information includes resource allocations or blocks that include time and frequency allocations for both the wireless device and the base station. The wireless device and the base station coordinate forward link and reverse link wireless communication according to the scheduling.

As previously described, for at least some embodiments one or more of the steps of selecting the MCS of the forward link and the return link is performed at a location different than at the base station. Further, for at least some embodiments, the scheduling of the forward and return link resources is performed at a location different than the base station. For example, for an embodiment, a scheduler service performs the MCS selection and scheduling, and then informs the base station.

As previously described, for an embodiment, the forward data rate requirement for the forward interval and the return data rate requirement for the return interval are determined by a voice encoder. As previously described, for an embodiment, the forward data rate requirement for the forward interval and the return data rate requirement for the return interval are determined by the voice encoder. As previously described, the voice encoder may include a CODEC (compression/decompression) that samples the voice signal at a fixed interval and generates data samples. For an embodiment, the sampling interval determines the timing interval requirement including the forward timing interval requirement and the return timing interval requirement. Further, for an embodiment, the forward data rate requirement for the forward timing interval and the return data rate requirement for the return timing interval are determined by the voice encoder of the wireless device.

At least some embodiments further include determining, by the base station, propagation timing information associated with the wireless device. For an embodiment, scheduling of the forward link resource allocations and the return link resource allocations of the wireless device is further based on the propagation timing information to ensure no overlap in scheduled uplink and downlink resources for the wireless device. For an embodiment, data or packets transmitted through the forward link and the return link are transmitted according to half duplex transmission. That is, the base station and the wireless device are only transmitting or receiving, but not both at the same time. Accordingly, the timing and scheduling of the data or packets transmitted through the forward link and the return link are timing critical. The scheduling of forward link and return link data for a full duplex system can be independent, whereas for half duplex systems the scheduling of forward link and return link data are dependent.

As described, for an embodiment, the determination of the MCS of the forward link is based at least in part on the MCS of the return link, and the determination of the MCS of the return link is based at least in part on the MCS of the forward link. For an embodiment, when determining the MCS of the forward link of the return link, the other of the forward link or the return link is assumed to be a default value. For other embodiments, the other of the forward link of the return link has already been determined.

As described, for an embodiment, the MCS of the forward link is further determined based upon an MCS of a forward link of another wireless device, and the MCS of the return link is further determined based upon the MCS of a return link of another wireless device. That is, for an embodiment, the base station is wirelessly communicating with multiple wireless devices through the satellite. Accordingly, the scheduling of one wireless device needs to account for the scheduling of the other wireless devices. For an embodiment, the scheduling forward link resource allocations and return link resource allocations of the wireless device is further based on forward link resource allocations and return link resource allocations of another wireless device.

For an embodiment, the base station utilizes a changing propagation timing information and a mismatch (small delta) in the propagation delays between forward and return delays for scheduling resources for forward and return links. As described, the satellites may be moving relative to the wireless devices at high speeds. Accordingly, the propagation delay between the forward link and the return link is constantly changing. Therefore, over differential moments in time, the forward link and the return link propagation delays will be slightly different. The scheduling accounts for the slight difference to align the forward link and the return link scheduling to avoid overlap. That is, one schedule of the forward link and the return link will be time offset by the timing differential between the forward link and the return link. For an embodiment, each of the forward link propagation delay and the return link propagation delay include both over-the-air propagation delays and computation delays at either the base station or the wireless device.

For an embodiment, the scheduling of the forward link resource allocations and the return link resource allocations of the wireless device is further based on the propagation timing information of other wireless devices to ensure no overlap in scheduled uplink and downlink resources for the wireless device and the other wireless devices. That is, the propagation delays of different wireless devices can be different due to the different locations of the wireless devices relative to the satellite. Accordingly, in order to avoid the scheduling of the different wireless devices from overlapping, the differences in the propagation delays between the different wireless devices accounts for the differences in the propagation delays in the scheduling of the forward link and return links of the different wireless devices.

For an embodiment, an output power of a satellite (Earth Station/Base station) forming the satellite link is selected based on the scheduling of the forward link resource allocations and the return link resource allocations of the wireless device. For an embodiment, a satellite of the satellite link provides a fixed level of gain, and the transmit power of the satellite is adjusted by adjusting a transmit power level of the base station.

As previously described, an embodiment includes adapting a transmit power of the satellite of the satellite link differently for different of a plurality of wireless devices. For an embodiment, the satellite transmit power for each of multiple wireless devices that the base station is wirelessly communicating with is adapted for each of the multiple wireless devices to ensure that the required data rate, link margin, and timing requirements are satisfied. However, for an embodiment, the satellite transmit power for each of the wireless devices does not exceed a threshold greater than the amount of transmit power needed to ensure that the required data rate, link margin, and timing requirements are satisfied. Additional transmission signal power can cause interference with other wireless devices.

For an embodiment, if a default transmission signal power of the satellite or the base station does not provide an MCS (forward link) selection that allows for satisfaction of the data rate and timing interval requirements of data (packet) communicated through the forward link and the return link then the transmission power level of the base station can be increased to provide additional (alternate) MCS forward link selections. The additional selections improves the chances that the MCS (forward link) selection will satisfy the data rate and timing interval requirements of data (packet) communicated through the forward link and the return link.

There are two common culprits for low link quality, signal to noise ratio and signal to interface ratio, both can limit the link quality under different circumstances for satellite communications through the forward link and the return link.

For an embodiment, when the signal to noise ratio is limiting the MCS selections, the base station may elect to dynamically increase the output power of transmission signals from the base station (and subsequently then the satellites power because for an embodiment, the satellite is a fixed gain system), on a dynamic basis for all symbols sent to a specific wireless device. The increased transmission power of wireless communication from the satellite to the base station improves the signal to noise ratio of wireless communications from the satellite to the wireless device which enables higher MCSs to be used, which can therefor enable MSC selection that allow data transmitted through the forward link and the return link to meet fixed timing requirements.

For an embodiment, when the signal to interference ratio is limiting the MCS selections, an adjacent base station may elect to decrease its transmit power on a per time frame basis to allow its neighbor base station (which may be the base station the wireless device is communicating with) to select a higher MCS now may available by the resulting reduction in interference.

An embodiment includes adapting a transmit power of a satellite of the satellite link based on the determined MCS of the wireless device. If the MCS of the wireless device is increased, the transmit power of the satellite may be accordingly increased to accommodate the increased MCS.

An embodiment includes adapting a transmit power of a satellite of the satellite link based on a determined level of interference of a neighboring wireless device. That is, if interference of the neighboring wireless device is determined to be above a threshold, the transmit power of the satellite may be accordingly decreased to mitigate the interference of the neighboring wireless device.

For an embodiment, a satellite of the satellite link provides a fixed level of gain, and wherein a transmit power of the satellite is adjusted by adjusting a transmit power level of the base station.

As an example, assume that the default transmission power levels from the base station and the wireless device is 50 dBW. Corresponding received signal strength through the forward link to the wireless device may be 5 dB, and the corresponding received signal strength through the return link to the base station may be 5 dB, which provides a representation of the forward and return link qualities. For this example, the forward and return link timing intervals may be 80 milliseconds, and the forward link and the return link data rates requirements may be 1 kilobit per second. The 5 dB of signal strength of the transmission signal from the base station supports an MCS of MCS5 with a repetition of 2. However, this MCS and repetition rate does not allow the data rate requirements to be met. However, by increasing the transmission power level of the base station up to 55 dBW, the forward link SINR increases to 10 dB. The SINR of 10 dB allows for the MCS selection of the forward link of MCS 10, and the data rate and timing interval requirements for the forward link and the return link can then be satisfied.

As another example, assume a current or default transmission power level of the base station of 50 dBW. Corresponding received signal strength through the forward link to the wireless device may be 5 dB, and the corresponding received signal strength through the return link to the base station may be 5 dB, which provides a representation of the forward and return link qualities. For this example, the forward and return link timing intervals may be 60 milliseconds, and the forward link and the return link data rates requirements may be 1 kilobits per second. The 5 dB of signal strength of the transmission signal from the base station supports an MCS of MCS5 with a repetition of 2. However, the time taken for MCS 5 and Repetition 2 in the return link is 40 milliseconds, leaving 20 milliseconds left for the forward link. The 20 milliseconds of the forward link only allows for an forward link MCS selection of MCS 5 and Repetition 1 which does not allow for closing of the link budget since a repetition 2 is needed to close the link. However, by increasing the transmission power of the base station to 55 dBW, the forward link signal strength goes to 10 dBm. The 10 dBm of forward link signal strength allows the link to be completed with the forward link MCS selection of MCS 5 and Repetition 1.

An embodiment includes monitoring, by the base station, the forward link quality of the forward link of the satellite link and the return link quality of the return link of the satellite link, and redetermining the MCS of at least one of the forward link or the return link, and rescheduling the forward link resource allocations and return link resource allocations of the wireless device when either of the forward link quality or the return link quality falls below a threshold.

For an embodiment, the forward data rate requirement for the forward timing interval and the return data rate requirement for the return timing interval for the wireless device are determined or received from a data generator or source. For an embodiment, the data source is the previously described voice encoder of the wireless device. For an embodiment, the forward data rate requirement for the forward timing interval and the return data rate requirement for the return timing interval are received every data-interval. For an embodiment, the data-interval is defined by how often data packets are received from the data generator or source. An embodiment includes buffering data (data packet) over multiple data-intervals which can allow changing of the forward timing interval and the return timing interval. For an embodiment, the forward timing interval and the return timing interval define how often forward data (data packets) and return data (data packets) are scheduled to be transmitted over the forward link and the return link. Accordingly, as described, for an embodiment, the buffering of the data of the data source over multiple data-intervals allows for increasing (changing) the forward timing interval and the return timing interval. Accordingly, the buffering and resulting increasing (changing) the forward timing interval and the return timing interval allows for new allocation schemes (MCS selections) to be used. That is, for a current set of conditions, an MCS selection for the forward link or the return link may not be possible. However, increasing the forward timing interval and/or the return timing interval may then allow an MCS selection to be possible. For example, of the combination of the forward timing interval and the return timing interval combined is determined to be 100 millisecond and the current data-interval is also 100 milliseconds, then the base station can buffer the data for 2 data-intervals, thereby adjusting the forward timing interval and the return timing interval combined to be 200 milliseconds. The MCS selections can then be made with the adjusted (increased) forward timing interval and the return timing interval.

For an embodiment, when a determination of the MCS of the at least one of the forward link or the return link based on the forward link quality, the return link quality, the forward data rate requirement and the return data rate requirement, a MCS of the other of the forward link and the return link, and forward timing interval and the return timing interval is not possible, then a negotiation with a data source of the forward data rate and the return data rate for a lower throughput requirement is performed. That is, the lower throughput requirement is performed when the determination of the MCS of the at least one of the forward link or the return link based on the forward link quality, the return link quality, the forward data rate requirement and the return data rate requirement, a MCS of the other of the forward link and the return link, and forward timing interval and the return timing interval is not possible. For an embodiment, the lower throughput requirement provides a change (decrease) in the forward data rate requirement and/or the return data rate requirement. For an embodiment, the negotiating occurs during a session establishment phase of a connection establishment between the base station and the wireless device. For an embodiment, the session establishment is a process of exchanging requirements between wireless device (application layer) and an application connected to the base station. For an embodiment, the list of requirements exchanged can include data rate, data-interval, forward and return intervals, transmit and receive port information (used for exchange), deciding on which voice encoder (CODEC) is used, user identifiers, IP address used, and/or bandwidth requirement. An example of a session establishment is an SIP (session initiation protocol) protocol exchange for voice communications where SDP (sessions description protocol) are exchanged. For an embodiment, an SDP offer is exchanged from both ends of the link (base station and wireless device. For an embodiment, SIP signaling carries information, such as, which IP address is voice traffic to be received on, what port number, what is the bandwidth is required for the service, and which CODEC is used for this service.

FIG. 6 is a resource allocation table 610 that depicts different MCSs (modulation and coding schemes) and corresponding resource unit allocations, according to an embodiment. Each block in the table 610 shows the number of bits that can be carried or a Transport Block Size. Each of the blocks of the table 610 represents a resource unit that includes a unit of time and frequency block. Each of the resource units takes a predefined amount of time to transmit. Each resource unit can carry a predefined number of bits as shown in the table 610. It is to be noted that there is not a one-to-one mapping between 1 RU and multiple RUs in terms of the number of bits the resource unit can carry because the number of bits is allowed is dependent on the coding schemes used as well.

FIG. 7 shows tables 710, 720 that depict selected values of MCS for downlink (forward link) and uplink (return link) based on the forward link quality (link margin DL), the return link quality (link margin UL), the forward data rate requirement and return data rate requirement (data rate), and forward timing interval (time allocated for downlink) and the return timing interval (total time-time allocated for downlink), according to an embodiment. A first table 710 shows selected values of MCS for a low data rate (1 kbps (kilobit per second)), and a second table 720 shows selected values of MCS for a high data rate (2 kbps).

The payload length for both tables is 160 kilobits. A total time of 160 milliseconds is a time period in which both uplink (return link) and downlink (forward link) communication needs to be completed. For example, the uplink (return link) may be completed 80 milliseconds and then the downlink (forward link) in 80 milliseconds.

For the low data rate table 710, the data rate is 1 kbps. For the high data rate table 710, the data rate is 2 kbps.

A portion of the total time is allocated to downlink (forward) link transmission and the other portion of the total time is allocated to the uplink (return) link. The tables 710, 720 show different times allocated to downlink (forward link) transmission. Further the tables 710, 720 include different possible options for the MCS and the repetitions which have varying levels of link margin. It can be observed from the tables 710, 720 that for greater allocations of time to the downlink (forward link), the less time allocated to the uplink (return link) which impacts the MCS and repetition selections and results in a lower link margin for the uplink (return link). Tables 710, 720 demonstrate the interplay and interdependency between the time allocation in uplink and downlink and how the allocations impact the link margins.

It can be observed that for the high data rate case of table 720 that when the time allocation to the downlink is at the highest value of 112 milliseconds no selections are available for the uplink MCS and uplink repetitions because there is not enough time allocated to the uplink to meet the required data rate. Accordingly, the link budget needed cannot be achieved.

As previously described, for an embodiment, the transmit power of the base station and accordingly the transmit power of the satellite is increased to allow the selection of a greater MCS in the forward link (downlink). Accordingly, less time is allocated to the forward link (downlink), and more time is allocated to the return link (uplink), which increases the possible MCS and repetition selections in the return link (uplink) which is some cases can make it possible that there is an MCS and repetition selection available in the return link (uplink), and the link margin in the return link (uplink) is possible.

Figure 8:
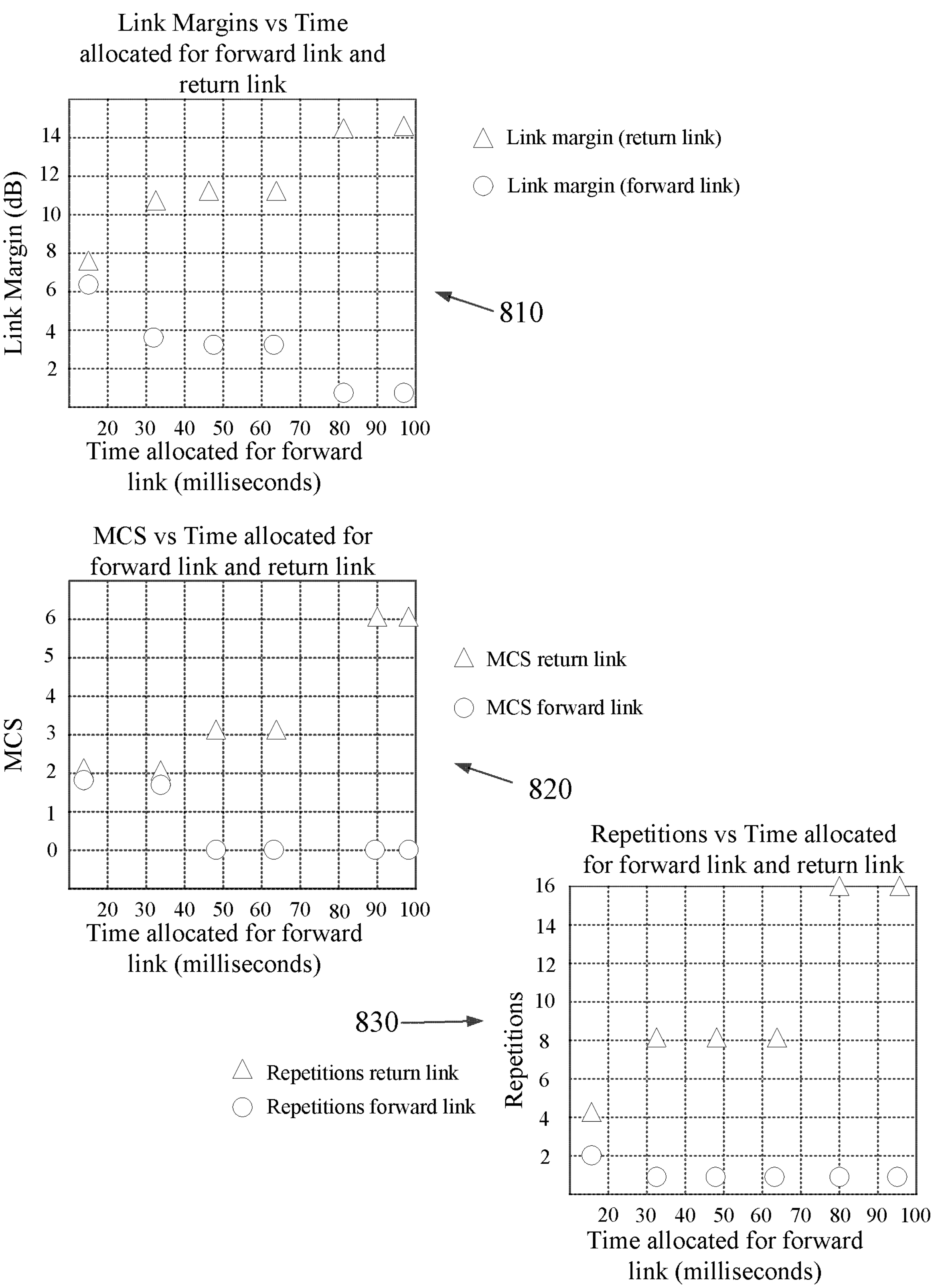
FIG. 8 shows plots of link margin, MCS, and repetitions that correlate with the low data rate case table of FIG. 7.

FIG. 8 shows plots of link margin 810, MCS 820, and repetitions 830 that correlate with the low data rate case table of FIG. 7.

Figure 9:
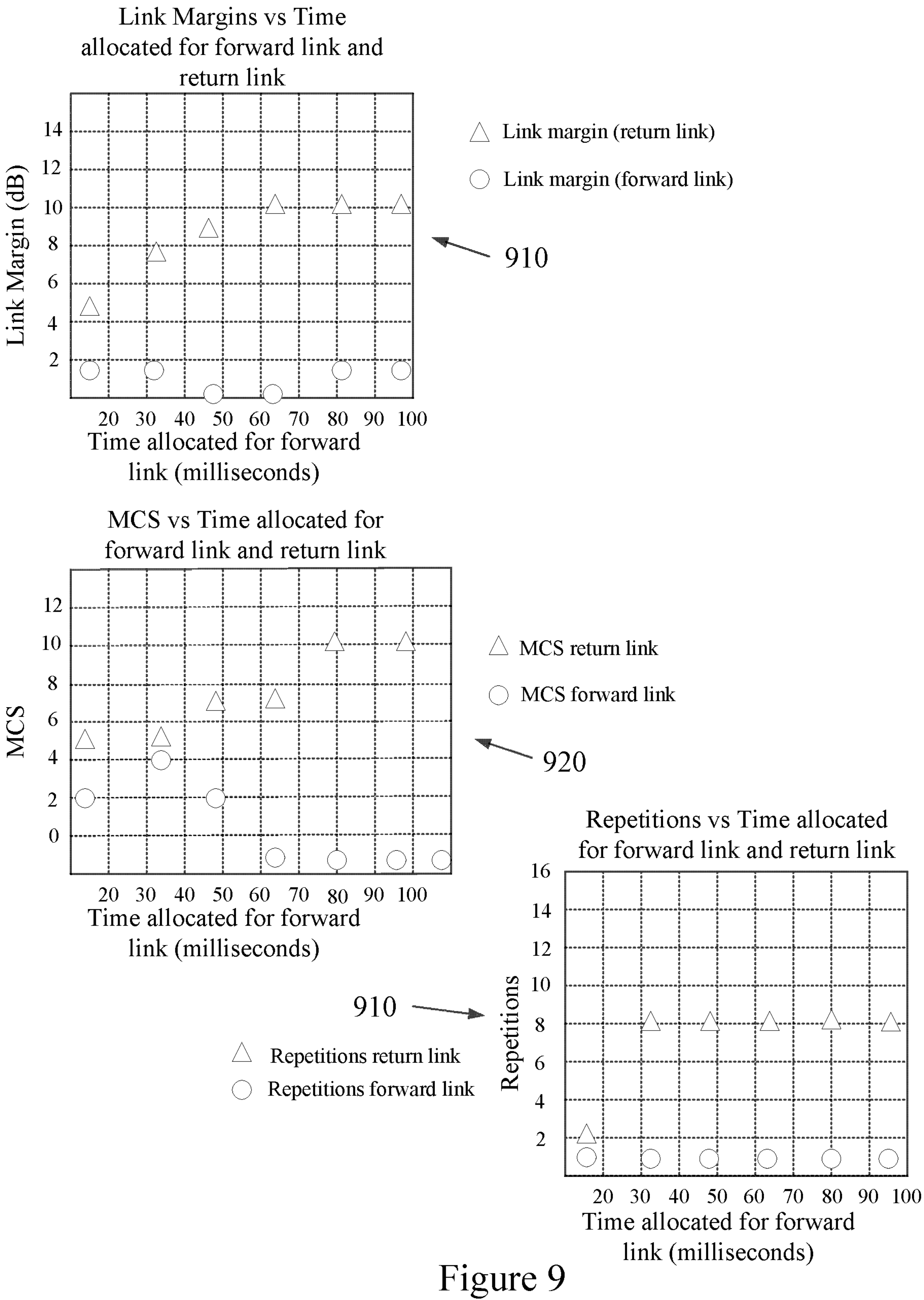
FIG. 9 shows plots of link margin, MCS, and repetitions that correlate with the high data rate case table of FIG. 7.

FIG. 9 shows plots of link margin 910, MCS 920, and repetitions 930 that correlate with the high data rate case table of FIG. 7.

The plots 810, 910 show the forward MCS and the return link margin versus time allocated to the forward link. The triangle points represent the return link margin, while the circle points indicate the forward link margin.

The plots 820, 920 show the forward link MCS and the return link MCS versus time allocated to the forward link. The triangle points represent the return MCS, while the circle points indicate the forward link MCS.

The plots 830, 930 show the forward link repetitions and the return link repetitions versus time allocated to the forward link. The triangle points represent the return repetitions, while the circle points indicate the forward link repetitions.

The plots provide a visualization to help understand how these margins change with respect to the time allocation for forward link and the return link. The low data rate case of plots 810, 820, 830 show higher link margins than for the high data rate case of the plots 910, 920, 930.

As previously described, for an embodiment, the transmit power of the satellite is adapted to close both the forward link and the return (based on a link budget) while meeting data rate and timing requirements of the type of data (such as, voice data).

Although specific embodiments have been described and illustrated, the embodiments are not to be limited to the specific forms or arrangements of parts so described and illustrated. The described embodiments are to only be limited by the claims.

What is claimed:

1. A method of scheduling wireless communication through a wireless satellite link between a base station and a wireless device, comprising:

determining a forward link quality of a forward link of the wireless satellite link and a return link quality of a return link of the wireless satellite link;

determining a forward data rate requirement for a forward timing interval and a return data rate requirement for a return timing interval for the wireless device;

determining a modulation and coding scheme (MCS) of at least one of the forward link or the return link based on the forward link quality, the return link quality, the forward data rate requirement and the return data rate requirement, a MCS of the other of the forward link and the return link, and the forward timing interval and the return timing interval;

scheduling forward link resource allocations and return link resource allocations of the wireless device based on the MCS of the forward link, the MCS of the return link, a forward data rate requirement and a return data rate requirement, and the forward timing interval and the return timing interval; and wirelessly communicating, by the base station, with the wireless device according to the scheduled forward link resource allocations and return link resource allocations.

2. The method of claim 1, further comprising determining, by the base station, propagation timing information associated with the wireless device.

3. The method of claim 2, wherein scheduling of the forward link resource allocations and the return link resource allocations of the wireless device is further based on the propagation timing information to ensure no overlap in scheduled uplink and downlink resources for the wireless device.

4. The method of claim 3, wherein scheduling of the forward link resource allocations and the return link resource allocations of the wireless device is further based on the propagation timing information of other wireless devices to ensure no overlap in scheduled uplink and downlink resources for the wireless device and the other wireless devices.

5. The method of claim 1, wherein determining the MCS of the other of the forward link and the return link is initially determined based on a default value.

6. The method of claim 1, wherein the MCS of the forward link is further determined based upon an MCS of a forward link of another wireless device, and the MCS of the return link is further determined based upon the MCS of a return link of another wireless device.

7. The method of claim 1, wherein the scheduling forward link resource allocations and return link resource allocations of the wireless device is further based on forward link resource allocations and return link resource allocations of another wireless device.

8. The method of claim 1, wherein an output power of a satellite forming the satellite link is selected based on the scheduling of the forward link resource allocations and the return link resource allocations of the wireless device.

9. The method of claim 1, further comprising adapting a transmit power of a satellite of the satellite link differently for different of a plurality of wireless devices.

10. The method of claim 1, wherein the forward timing interval includes time allocated for downlink, and the return timing interval includes a total time minus the time allocated for the downlink.

11. The method of claim 1, further comprising adapting a transmit power of a satellite of the satellite link based on a determined level of interference of a neighboring wireless device.

12. The method of claim 1, wherein a satellite of the satellite link provides a fixed level of gain, and wherein a transmit power of the satellite is adjusted by adjusting a transmit power level of the base station.

13. The method of claim 1, further comprising adapting a transmit power of a satellite of the satellite link from one resource block to another resource block of the scheduled forward link resource allocations and return link resource allocations of the wireless device, wherein each resource block of the schedule includes a time and frequency allocation.

14. The method of claim 12, wherein the base station utilizes a changing propagation timing information and a mismatch in propagation delays between forward and return delays for scheduling resources for forward and return links.

15. The method of claim 1, further comprising:

monitoring, by the base station, the forward link quality of the forward link of the satellite link and the return link quality of the return link of the satellite link;

redetermining the MCS of at least one of the forward link or the return link, and rescheduling the forward link resource allocations and return link resource allocations of the wireless device when either of the forward link quality or the return link quality falls below a threshold.

16. The method of claim 1, wherein when a determination of the MCS of the at least one of the forward link or the return link based on the forward link quality, the return link quality, the forward data rate requirement and return data rate requirement, a MCS of the other of the forward link and the return link, and forward timing interval and the return timing interval is not possible, the further comprising negotiating with a data source of the forward data rate and the return data rate a lower throughput requirement.

17. A satellite system comprising:

a base station;

a wireless device;

a satellite configured to support a satellite link between the base station and the wireless device;

the base station configured to:

determine a forward link quality of a forward link of the satellite link and a return link quality of a return link of the satellite link;

determine a forward data rate requirement for a forward timing interval and a return data rate requirement for a return timing interval for the wireless device;

determine a modulation and coding scheme (MCS) of at least one of the forward link or the return link based on the forward link quality, the return link quality, the forward data rate requirement and the return data rate requirement, a MCS of the other of the forward link and the return link, and the forward timing interval and the return timing interval;

schedule forward link resource allocations and return link resource allocations of the wireless device based on the MCS of the forward link, the MCS of the return link, a forward data rate requirement and a return data rate requirement, and the forward timing interval and the return timing interval; and wirelessly communicate with the wireless device according to the scheduled forward link resource allocations and return link resource allocations.

18. The system of claim 17, where the base station is further configured to determine propagation timing information associated with the wireless device, and wherein scheduling of the forward link resource allocations and the return link resource allocations of the wireless device is further based on the propagation timing information to ensure no overlap in scheduled uplink and downlink resources for the wireless device.

19. The system of claim 17, wherein the scheduling forward link resource allocations and return link resource allocations of the wireless device is further based on forward link resource allocations and return link resource allocations of another wireless device, and wherein scheduling of the forward link resource allocations and the return link resource allocations of the wireless device is further based on the propagation timing information of other wireless devices to ensure no overlap in scheduled uplink and downlink resources for the wireless device and the other wireless devices.

20. The system of claim 17, where the base station is further configured adapt a transmit power of a satellite of the satellite link from one resource block to another resource block of the scheduled forward link resource allocations and return link resource allocations of the wireless device, wherein each resource block of the schedule includes a time and frequency allocation.

* * * * *